United States Patent Office 3,171,099
Patented Feb. 23, 1965

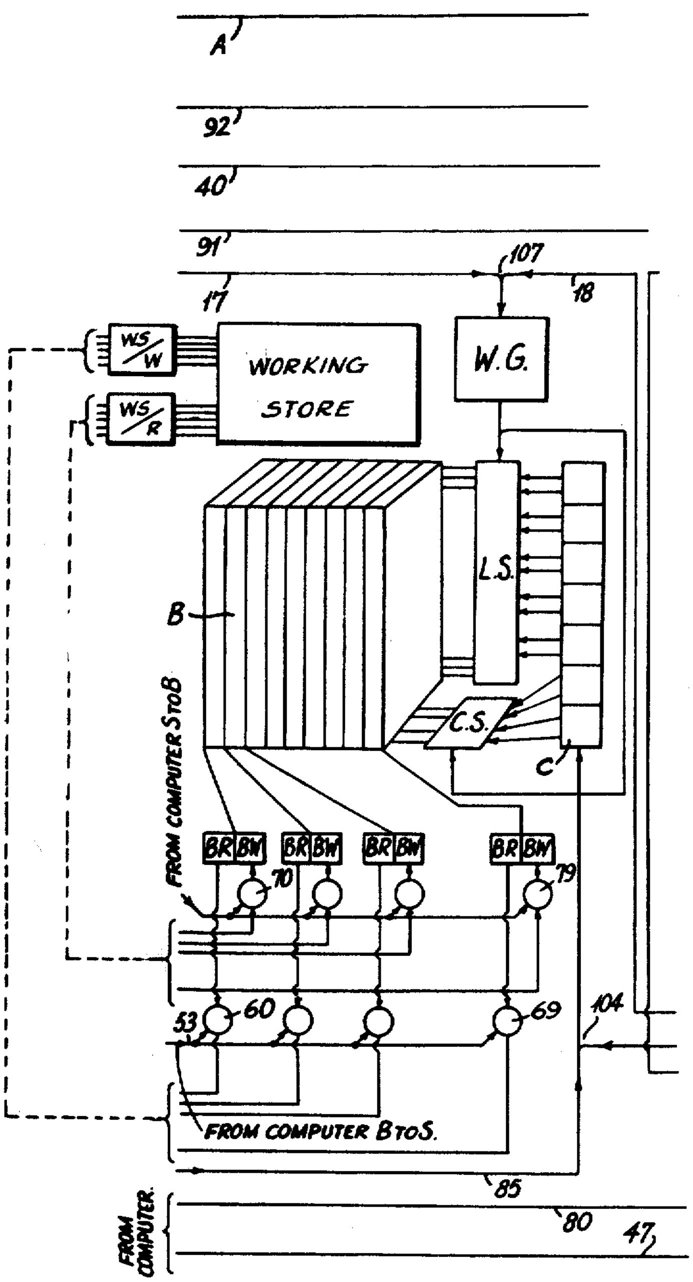
Fig. 1. A

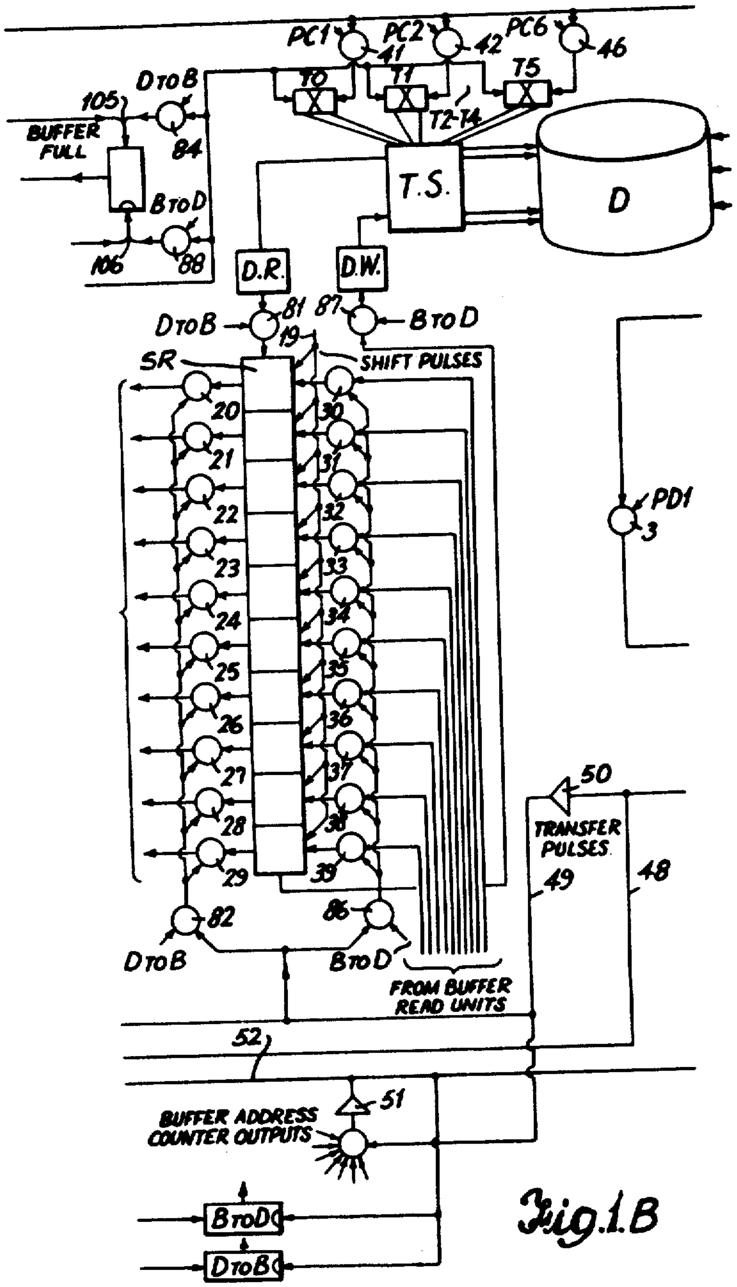
Fig. 1.B

3,171,099
DIGITAL COMPUTERS FOR DATA PROCESSING SYSTEMS

Ronald Mitford Foulkes, Sale, England, assignor to Associated Electrical Industries (Manchester) Limited, London, England, a British company Filed Apr. 1, 1958, Ser. No. 725,686
Claims priority, application Great Britain, Apr. 1, 1957, 10,585/57
6 Claims. (Cl. 340—172.5)

This invention relates to electronic digital computers. It is concerned with storage systems used in such computers, particularly where large storage capacity is required, such as in data processing systems.

It is common practice to provide more than one type of storage in a digital computer. The working store of the computer should have as fast an access time as possible and must also provide information at the same rate as the rate at which the arithmetic unit of the computer operates. This may well be in the region of 1 mc./s. These requirements make it uneconomical with the present types of fast storage to have a very large capacity fast store.

The above difficulty may be overcome by providing a backing store as additional storage with facilities for transferring blocks of information from one store to the other. The backing store, usually a magnetic drum or magnetic tape, will have a large capacity but also will have a comparatively long accesss time and will in general work at a lower frequency than the fast working store.

In the operation of such a computer time will be lost in seeking information from such a slow access-time store and transferring it to the working store.

According to the present invention an electronic digital computer includes a fast access working store and a slower access backing store, together with an intermediate fast access buffer store, means for feeding digital information between the buffer store and the working store at the operating rate of the working store, and means for feeding digital information between the buffer store and the backing store at the operating rate of the backing store.

A particular application of the invention is in transferring information from the large capacity relatively slow speed store formed by a magnetic drum or magnetic tape to the high speed fast access working store of a computer, which may for instance comprise a magnetic core matrix.

In such a case the magnetic drum or tape will deliver its information in serial form while the magnetic core matrix utilises information in simultaneous form. Means are therefore provided for staticising information fed from the drum to the core matrix and dynamicising information fed in the reverse direction.

The buffer store may conveniently be a magnetic core type of store, or, alternatively, other forms of fast access store may be used, such, for example, as a cathode ray tube, or ferro electric store.

The operation of a preferred embodiment of the invention is as follows. Sometime before it requires the information the computer instructs the backing store which block of information it will require and then continues with its calculations using information already in the working store. On receiving this instruction the backing store searches for the required block of information and on finding it transfers it to the buffer store using its own clock frequency to control the transfer. This operation takes place quite independently of the main computer. When it is ready to use the invention the computer interrogates the backing store to ensure that the information is in the buffer and if it is then transfers it to its working store at the computer clock frequency. If the information is not yet in the buffer the computer must wait until it is.

The operation of transferring information from the working store of the computer to the backing store is as follows. The block of information is first transferred to the buffer store at the computer clock frequency. The computer then instructs the backing store where this information is to be put. The computer is now free to continue its calculation using information still in the working store. The backing store searches for the required block address and on finding it transfers the information thereto from the buffer store. Until this transfer is complete the computer cannot initiate a further transfer in either direction.

It will be appreciated that with such an arrangement the arithmetic unit of the computer can continue to operate while a search is performed to seek the required information from the backing store. In addition information can be transferred to the working store at its own operating clock frequency.

In order that the invention may be more fully understood reference will now be made to the drawings accompanying this specification, in which:

FIGS. 1*a*, 1*b*, and 1*c* show a circuit arrangement in accordance with the invention;

FIGURE 1*d* shows a simple outline drawing in block form of the whole computer store arrangement relative to FIGURES 1*a*, 1*b*, and 1*c*.

FIGS. 2*a* and 2*b* are diagrams of wave forms generated by the drum store in FIG. 1;

Figure 1C:
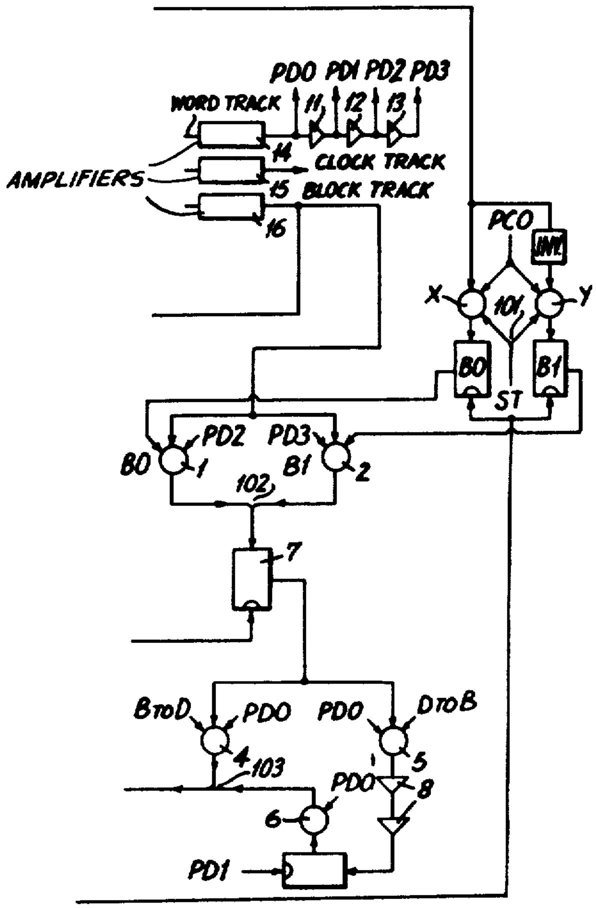
Figure 1D:
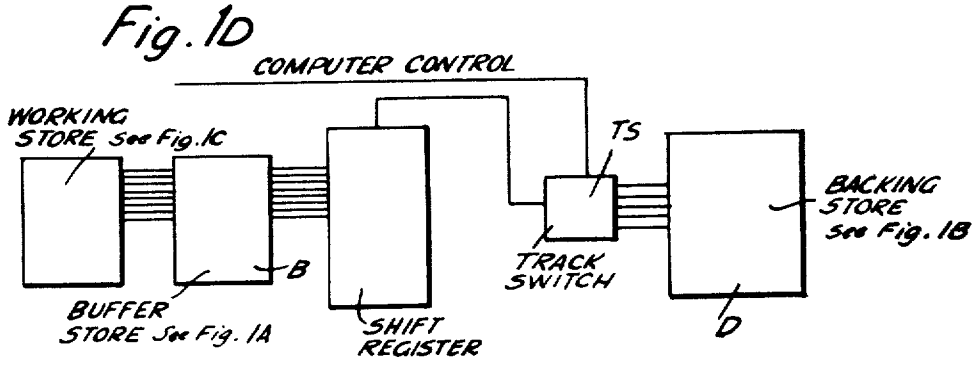
Figure 4:
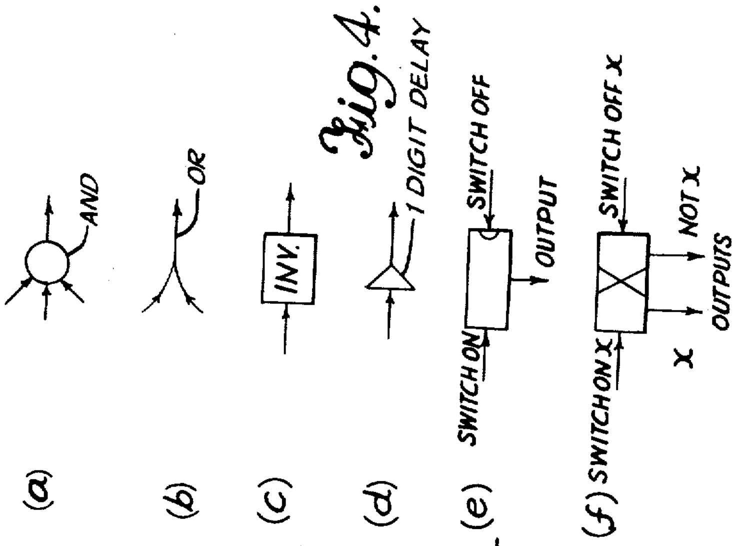
FIG. 4 is an illustration of the symbols used in FIG. 1.

Referring to FIG. 4 there are shown therein illustrations of the logical symbols used in the circuit arrangement shown in FIG. 1. FIG. 4*a* shows an AND gate which provides an output when co-incident inputs are received. FIG. 4*b* shows an OR gate which provides an output in response to the input from either one or the other of its branches, FIG. 4*c* shows an inverter, FIG. 4*d* shows a one digit delay, FIG. 4*e* shows a two-state circuit having one output and two inputs, one of which inputs switches the circuit on while the other input switches the circuit off as shown. FIG. 4*f* is a two-state circuit having two outputs, X and not X, one of which outputs is the inverse of the other. This circuit has two inputs as shown.

Referring to FIG. 1, there is shown therein part of the storage system for an electronic digital computer comprising a magnetic drum of large storage capacity utilised as a backing store for a working store (not shown) formed of magnetic cores. The arithmetic operations in the computer are performed on numbers represented by trains of binary digits, ten of which digits make up one word. These digits occur at a clock frequency of the order of 1 mc./s., the working store of the computer operates at $\frac{1}{10}$ of this frequency and has ten parallel inputs and outputs. Blocks of 128 words are transferred to and from the magnetic drum as required.

Figure 2A:
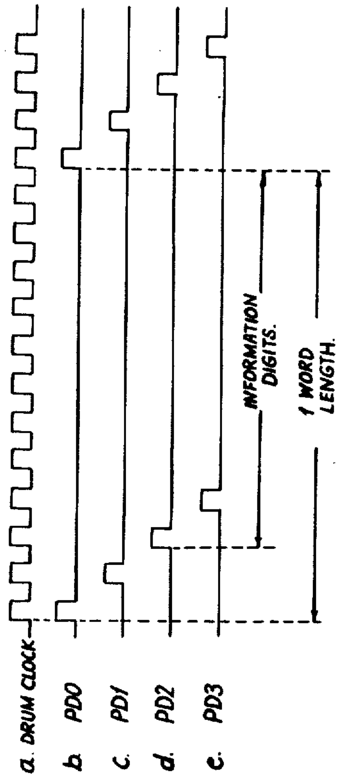
Figure 2B:
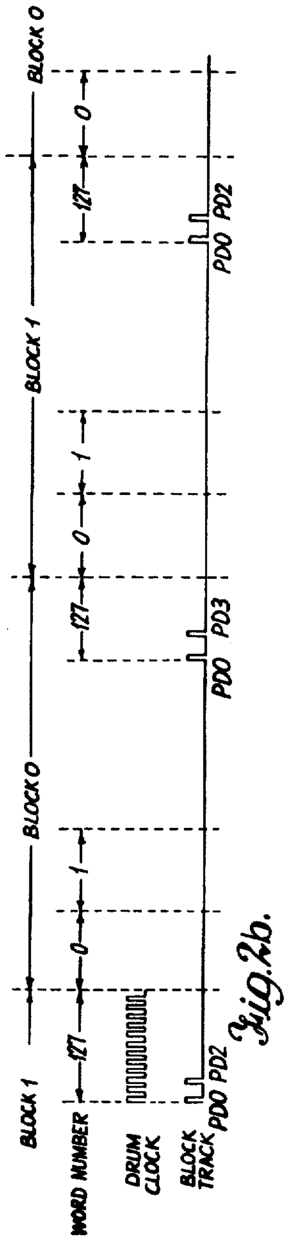

The magnetic drum D has 128 separate tracks on which it stores information, there being 256 words on each track. In addition it has three tracks containing permanent timing waveforms shown in FIGS. 2*a* and 2*b*. These timing tracks are the clock track *a*, which defines each digit period, word track *b*, which produces a pulse PD0 to define the first digit period in each word, and the block track FIG. 2*b*, which defines the beginning of each of the two blocks of 128 words on a track. From the PD0 pulse additional pulses PD1 (shown at *c*), PD2 (shown at *d*) and PD3 (shown at *e*) are each generated from the word track by means of successive one digit delays 11, 12 and 13. As shown in FIG. 1 each of the three timing tracks are read out to appropriate parts of the circuit through respective amplifiers 14, 15 and 16.

The block track (FIG. 2*b*) has one digit recorded on it in the PD2 position of the word period immediately before the first word in block 0. It has another digit recorded in the PD3 position of a word period immediately before hte first word in block 1. It also has a digit recorded in each of the PD0 positions preceding the above two pulses. Information on the drum is recorded as groups of ten pulses with a two digit gap between them, thus the information recorded in one word period is separated from the information in the next word period by a two digit gap.

Access to each of the 128 tracks on the drum is through a track switch TS which enables a single write unit DW and a single read amplifier DR to be switched to the track containing the block address required. The buffer store B consists of magnetic cores wired in matrix fashion and has ten planes each containing 32×4 single cores. One word of ten digits is stored on ten cores with one core in each plane. The particular word required is selected by means of a column selector switch CS and the line selector switch LS. These switches are controlled by a seven stage binary buffer address counter C, the least significant digits of the counter controlling the column selector switch CS. Each plane has its own read amplifier BR and write unit BW, the input to the latter deciding whether a zero or a unit digit will be retained in the selected core in that plane. Writing of information into and reading information from the buffer store is controlled by a waveform generator WG and may be in accordance with any of the well known systems for driving magnetic core stores. The timing of the actual read and write operations, that is the time allowed each word being read or written, is controlled by pulses fed to WG from either the computer, along line 17, or along line 18 which carries pulses timed to the drum clock frequency depending on which is concerned in the particular transfer taking place.

The output from the drum is in serial from and must be staticised before it can be read into the buffer. Similarly the outputs of the buffer must be serialised before they can be written into the drum. These two requirements are satisfied by shift register SR. This consists of ten statiscisers connected so that when a shift pulse from the line 19 is applied to them each one takes up the state of the previous one; in the diagram the one above. The first or top staticiser takes up the state defined by the input digit from the drum read amplifier DR. Thus a series of ten shift pulses will cause ten digits from the DR to be shifted into SR and be staticised therein. Read digits can then be fed out via individual gates 20–29 connected to each of the staticisers. The outputs of these gates are individually connected to the associated buffer write units BW through a ten way line (not shown).

The outputs of the buffer read units are similarly connected through individual lines to gates 30–39 the outputs of which feed the shift register SR in parallel to set each stage to a state corresponding to the digit from the buffer. If a series of ten shift pulses is now applied through line 19 to the shift register the state of the last staticiser will be a serialised version of the buffer outputs and can be fed to the drum write unit DW and recorded on the drum.

Figure 3:
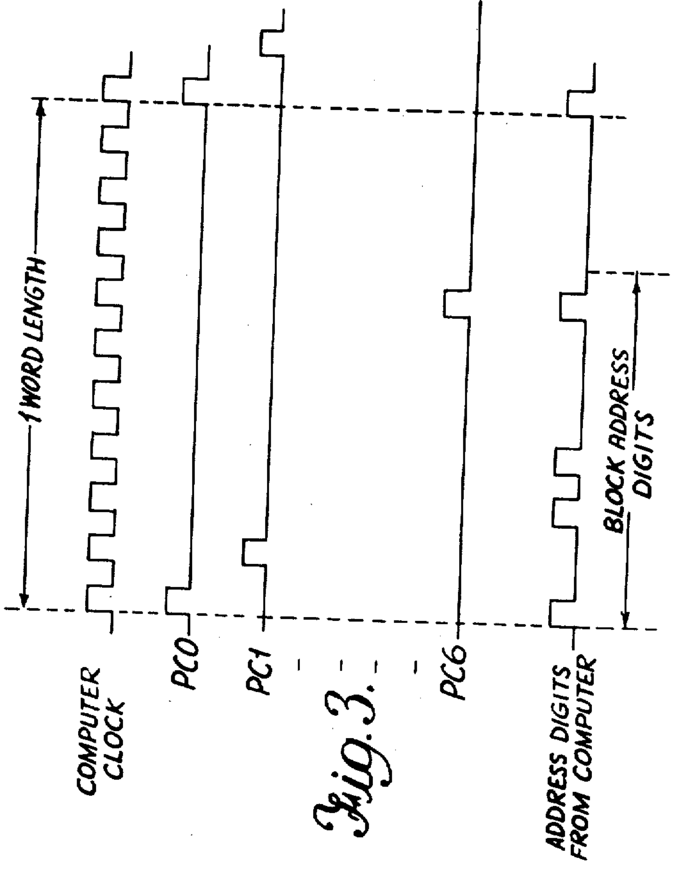
FIG. 3 is a diagram of wave forms generated by the computer.

The action of the system when transferring a block of 128 words from the drum to the working store of the computer is as follows:

The computer on getting the instruction that the transfer of a certain block is needed checks that the two-state circuit BUFFER FULL does not give a positive indication along line 40 which indicates that the buffer store is full and then sets the address of the block specified on the track selectors T0–T5. It also switches on one of the two-state circuits B0 or B1 specifying which block of the selected track is required. This is done via gates X or Y which are opened by a start transfer pulse ST lasting for one computer word and fed through OR gate 101. The address of the block is fed in serial form on line A and sampled by the appropriate P0 pulses in the AND gates 41–46 as shown. These P0 pulses are generated in the computer itself and time the different digit positions in a computer word. The timing of these P0 and address pulses is shown in FIG. 3. The computer also switches on the two-state circuit "D TO B" along line 47 to indicate the direction of the transfer. The output of this two-state circuit "D TO B" is connected to various AND gates 81, 82, 83 and 84 to ensure that they are open for the appropriate pulses.

The setting of either B0 or B1 causes the drum circuit to commence searching for the block specified. During the word period preceding the first word in the block a pulse from either gate 1 or gate 2 fed through OR gate 102 will switch on the two-state co-incidence circuit 7 which will stay on until a pulse from gate 3 during the last word period of the block switches it off. Gate 5 now produces a series of pulses timed to PD0 defining the first digit period of each word to be transferred. For the transfer D TO B these pulses are delayed one complete word by delay 8 and then emerge from gate 6.

The address counter of the buffer normally waits on address 127. The first pulse from gate 6 is directly applied to the counter along line 48 through OR gates 103 and 104 and changes the counter to zero and address zero is selected. The shift register SR is fed with a group of ten shift pulses timed so that the digits of the first word in the block store on the track read by DR are shifted into the register and at the end of the word are staticised on it. When the first pulse from gate 6 appears the first word from the drum will have been staticised on the shift register. One digit later the first transfer pulse fed along line 49 and which is produced by delaying the output from gate 6 by one digit in delay 50 will appear. This transfer pulse allows the contents of the shift register SR to be fed into the associated write units BW of the buffer. At the same time the transfer pulse is applied to the driver unit WG of the buffer and this causes the contents of the shift register to be written in the address zero of the buffer. This action of shifting the digits read from the drum into the shift register adding one to the address counter of the buffer and then writing the contents of the shift register into the buffer address selected by the counter continues until the supply of pulses from gate 6 ceases. The transfer to the buffer is then complete.

The end of the transfer is indicated by a pulse ET which is one digit later than the last transfer pulse and is generated by gating address 127 of the buffer address counter with the transfer pulses and delaying the resulting pulses by one digit in delay 51. This pulse ET is fed over line 52 to switch off B0 or B1 whichever was on and also switches on the two-state circuit BUFFER FULL via AND gate 84 and OR gate 105 which indicates to the computer along line 40 that the transfer to the buffer is now complete. Pulse ET also switches off the staticiser B TO D and D TO B, one of which had been previously switched on by the computer to indicate the direction of transfer.

The contents of the buffer must now be transferred to the working store of the computer. The working store is a magnetic core store made up of ten planes of cores, each plane containing 1024 cores arranged in 32 columns and 32 cores in each. This is similar to the buffer store but larger. A later instruction to the computer tells it to which part of its working store the contents of the buffer are to be transferred. The computer then sets its working store address selection device to the correct address (the one preceding the first address to be transferred) and examines the BUFFER FULL indication from line 40 to see if transfer to the buffer is complete.

If BUFFER FULL is not indicated the computer waits until it is before proceeding with the transfer to its working store. It then sends a set of 128 address setting pulses to the buffer address counter over line 85 co-incident with 128 pulses sent to its own working store address selection device. Thus two address selection systems step through 128 addresses in synchronism. The computer also sets one of the two-state devices B TO S and S TO B (not shown), in this case B TO S, to signify the direction of transfer. The output of B TO S is fed along line 53 to the ten AND gates 60–69 associated with each buffer read unit. The 128 address setting pulses occur at ten digit intervals at the computer clock frequency and after each one a pulse is sent to the read write driver of both the working store and the buffer store along line 17 and OR gate 107 causing a read-write operation in each case. The outputs of the ten read amplifiers BR of the buffer are gated by B TO S in the ten AND gates 60–69 and fed to the ten write units of the working store (not shown) causing the contents of the buffer to be written into the working store. At the end of the 128 pulses the two-state circuit B TO S and BUFFER FULL (along line 91) are switched off, the transfer is complete and the computer can continue with its next instruction.

The action of the system when transferring from the working store to the drum is similar to the above but with the order reversed. The first instruction to the computer is to transfer the contents of part of its working store to the buffer. It first checks that BUFFER FULL is not indicated and then sets its working store selection device to the correct address (one preceding the first address to be transferred). If BUFFER FULL is indicated it means a programming error and the computer stops. The computer then switches on two-state circuit S TO B thus opening AND gates 70–79 to each of the buffer write units and generates a set of 128 pulses as before which step the address selection devices through the 128 addresses of the two stores. The read-write drivers of both stores are triggered by pulses following each of the 128 pulses and a write operation into the buffer store B takes place from the working store. The ten outputs of the working store read amplifier are gated by S TO B in gates 70–79 and fed to the write unit of the buffer thus writing the block of information from the working store in the buffer. At the end of 128 pulses S TO B is switched off and BUFFER FULL is switched on (along line 92) to indicate that the buffer contains information not yet transferred to the drum. The transfer to the buffer is now complete.

The next instruction to the computer is to transfer the contents of the buffer to a particular block location on the drum. The computer when it gets this instruction sets the address of the block specified on the track staticisers T0–T5 and also switches on one of the two-state circuits B0 and B1 to specify which block on the track is required. It also switches on the two-state circuit B TO D along line 80 thus conditioning the AND gates 86, 87, 88 and 5 and is then free to continue obeying instructions, the rest of the transfer being controlled from the drum.

In a similar way to the transfer from the drum to the buffer the switching on of B0 or B1 causes the coincidence circuit 7 to be switched on just before the start of the block required. In this case the output of gate 4 is a series of 128 pulses timed to the first digit PD0 of each of the drum addresses to be filled. The first of these pulses steps the buffer address counter C on to address zero and one digit later a transfer pulse from line 49 is fed along line 18 and triggers the read write driver WG of the buffer and also allows the outputs of the ten buffer read amplifiers BR to be fed through gates 30–39 and set the shift register SR. Ten shift pulses from line 19 then shift this information into the drum unit DW causing it to be written in digit position PD2 and PD11 of the first address position on the drum. This setting of the buffer address counter transferring information from the buffer to the shift register and then shifting it into the drum is continued until the contents of all 128 addresses have been transferred. When this has occurred the end of transfer pulse ET switches off the BUFFER FULL indication through the open AND gate 88 and OR gate 106 and also switches off B TO D and B0 or B1 whichever was on. The transfer is now complete and the drum and buffer are available for other transfers when the computer so desires.

What I claim is:

1. An electronic digital computer including a fast access working store designed to receive and provide information in simultaneous form, a slower access backing store designed to receive and provide information in serial form, a fast access buffer store designed to receive and provide information in simultaneous form interposed between said working store and said backing store, means for passing digital information in simultaneous form between the buffer store and the working store at the operating rate of the working store, a register interposed between the buffer store and the backing store, means for transferring digital information from the backing store to the register in serial form, means for transferring said information from the register to the buffer store in simultaneous form, means for receiving digital information in the register provided by the buffer store in simultaneous form and means for transferring said information to the backing store in serial form.

2. An electronic digital computer including a fast access working store designed to receive and provide information in simultaneous form, a slower access backing store designed to receive and provide information in serial form, a fast access buffer store designed to receive and provide information in simultaneous form interposed between said working store and said backing store, read means for reading out of said buffer store and write means for writing into said buffer store, a shift register interposed between the buffer store and the backing store, a serial input to said shift register from said backing store, a parallel output from said shift register to said write means of said buffer store, a parallel input to said shift register from said read means of said buffer store and a serial output from said shift register to said backing store.

3. An electronic digital computer according to claim 2 including means whereby said buffer store read means and write means are controlled from said backing store when transferring information to and from said serial register and are controlled from the computer when transferring information to and from said working store.

4. In an electronic digital computer a fast access working store arranged for parallel operation, a slower access backing store arranged for serial operation, a fast access buffer store arranged for parallel operation interposed between said working store and said backing store and a serial parallel transfer register interposed between the buffer store and the backing store, means included in the computer for selecting an address in the backing store, means to transfer information successively to the register, then to the buffer store and finally to the working store during transfer of information from a selected address in the backing store to the working store, and means to transfer the information successively to the buffer store, then to the register and finally to the selected address in the backing store during transfer of information from the working store to the backing store.

5. In an electronic digital computer a fast access working store arranged for parallel operation, a slower access backing store arranged for serial operation, a fast access buffer store arranged for parallel operation interposed between said working store and said backing store and a serial parallel transfer register interposed between the buffer store and the backing store, means included in the computer for selecting an address in the backing store, means operable during transfer of information from a selected address in the backing store to the working store to transfer the information successively first at a slow speed to the register, then at a fast speed to the buffer store, and finally at a fast speed to the working store, and means operable during transfer of information from the working store to the backing store to transfer the information successively first at a fast speed to the buffer store, then at a fast speed to the register, and finally at a slow speed to the selected address in the backing store.

6. In an electronic digital computer a fast access working store arranged for parallel operation, a slower access backing store arranged for serial operation, a fast access buffer store arranged for parallel operation interposed between said working store and asid backing store, and a serial parallel transfer register interposed between the buffer store and the backing store, means included in the computer to select an address in the backing store, means operable during transfer of information from a selected address in the backing store to the working store to transfer the information successively to the register, then to the buffer store, and finally to the working store, said transfers to and from the buffer store being controlled from the backing store, and means operable during transfer of information from the working store to the backing store to transfer the information successively to the buffer store, then to the register, and finally to the selected address in the backing store, said transfers to and from the buffer store being controlled from the working store.

References Cited in the file of this patent

UNITED STATES PATENTS

| | | |
|---|---|---|
| 2,850,234 | Bartelt et al. | Sept. 2, 1958 |
| 2,872,666 | Greenhalgh | Feb. 3, 1959 |
| 2,913,175 | Williams | Nov. 17, 1959 |
| 2,940,670 | Kilburn et al. | June 14, 1960 |
| 2,959,770 | Eckert | Nov. 8, 1960 |
| 2,974,866 | Haddad et al. | Mar. 14, 1961 |